No. 699,892. Patented May 13, 1902.
J. L. OWENS.
SMUT MACHINE.
(Application filed Feb. 4, 1901.)
(No Model.) 3 Sheets—Sheet 1.

WITNESSES.
INVENTOR
JOHN L. OWENS
BY
HIS ATTORNEYS

No. 699,892. Patented May 13, 1902.
J. L. OWENS.
SMUT MACHINE.
(Application filed Feb. 4, 1901.)

(No Model.) 3 Sheets—Sheet 2.

WITNESSES
E. G. Stause
Richard Paul

INVENTOR
JOHN L. OWENS
BY Paul & Hawley
HIS ATTORNEYS

THE NORRIS PETERS CO., PHOTO-LITHO., WASHINGTON, D. C.

No. 699,892. Patented May 13, 1902.
J. L. OWENS.
SMUT MACHINE.
(Application filed Feb. 4, 1901.)
(No Model.) 3 Sheets—Sheet 3.
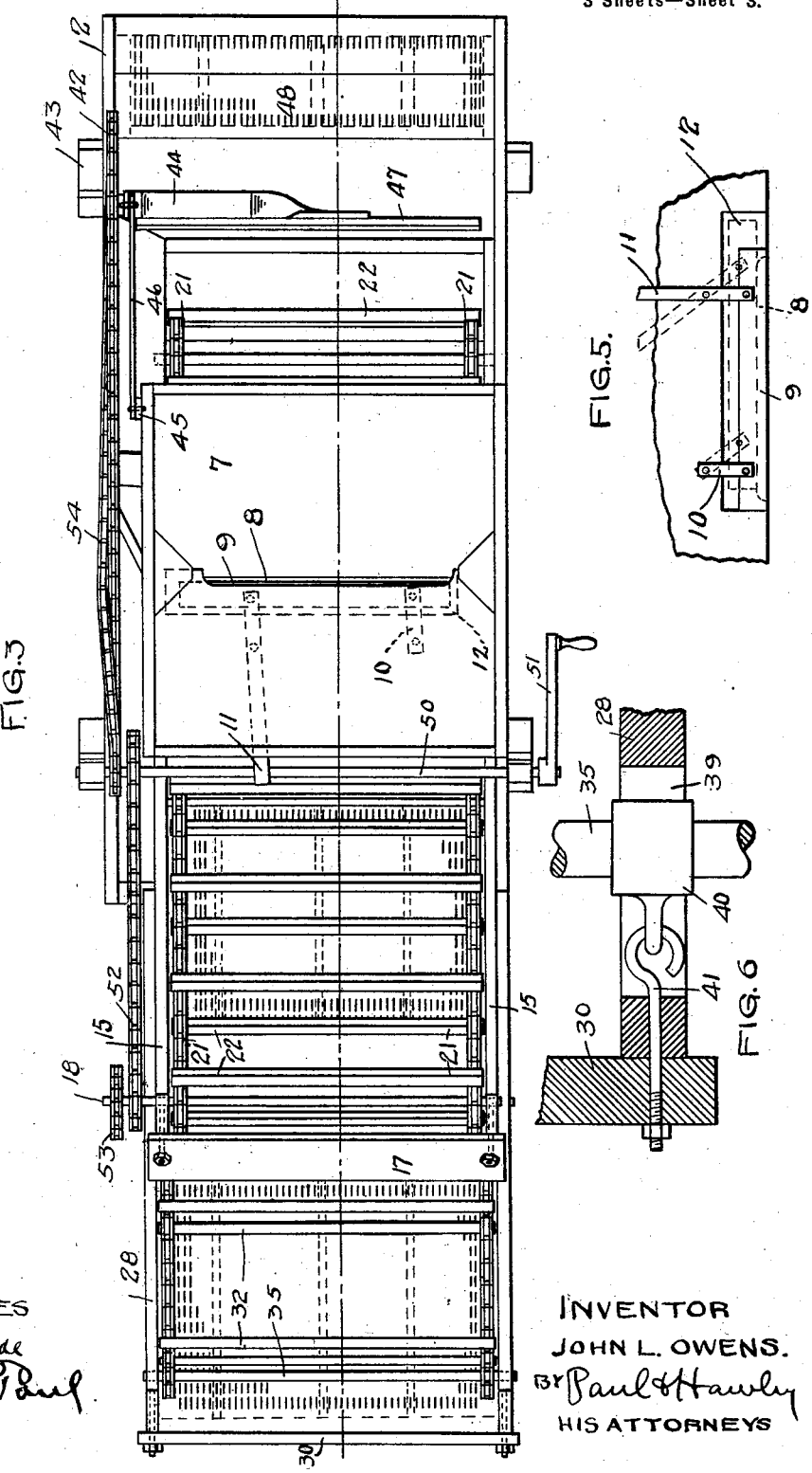
WITNESSES
INVENTOR
JOHN L. OWENS.
BY Paul & Hawley
HIS ATTORNEYS

UNITED STATES PATENT OFFICE.

JOHN L. OWENS, OF MINNEAPOLIS, MINNESOTA.

SMUT-MACHINE.

SPECIFICATION forming part of Letters Patent No. 699,892, dated May 13, 1902.

Application filed February 4, 1901. Serial No. 45,818. (No model.)

*To all whom it may concern:*

Be it known that I, JOHN L. OWENS, of Minneapolis, Hennepin county, Minnesota, have invented certain new and useful Improvements in Smut-Machines, of which the following is a specification.

The invention relates to grain-cleaning machines; and the object of the invention is to provide a machine for rapidly and thoroughly cleaning and removing smut and other light deleterious particles from wheat and other grains.

The invention consists generally in various constructions and combinations, all as hereinafter described, and particularly pointed out in the claims.

Figures 1, 4:
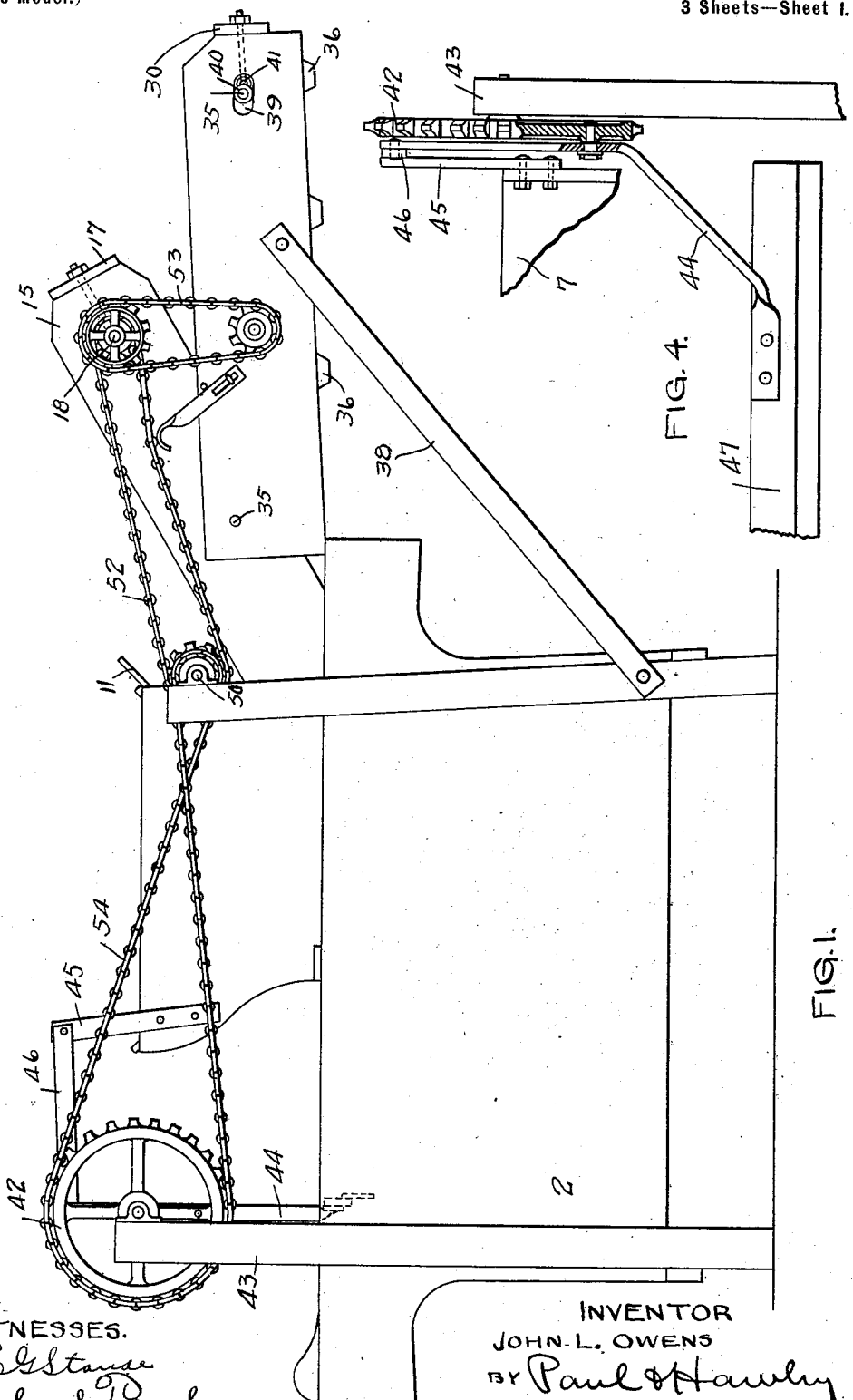
Figure 2:
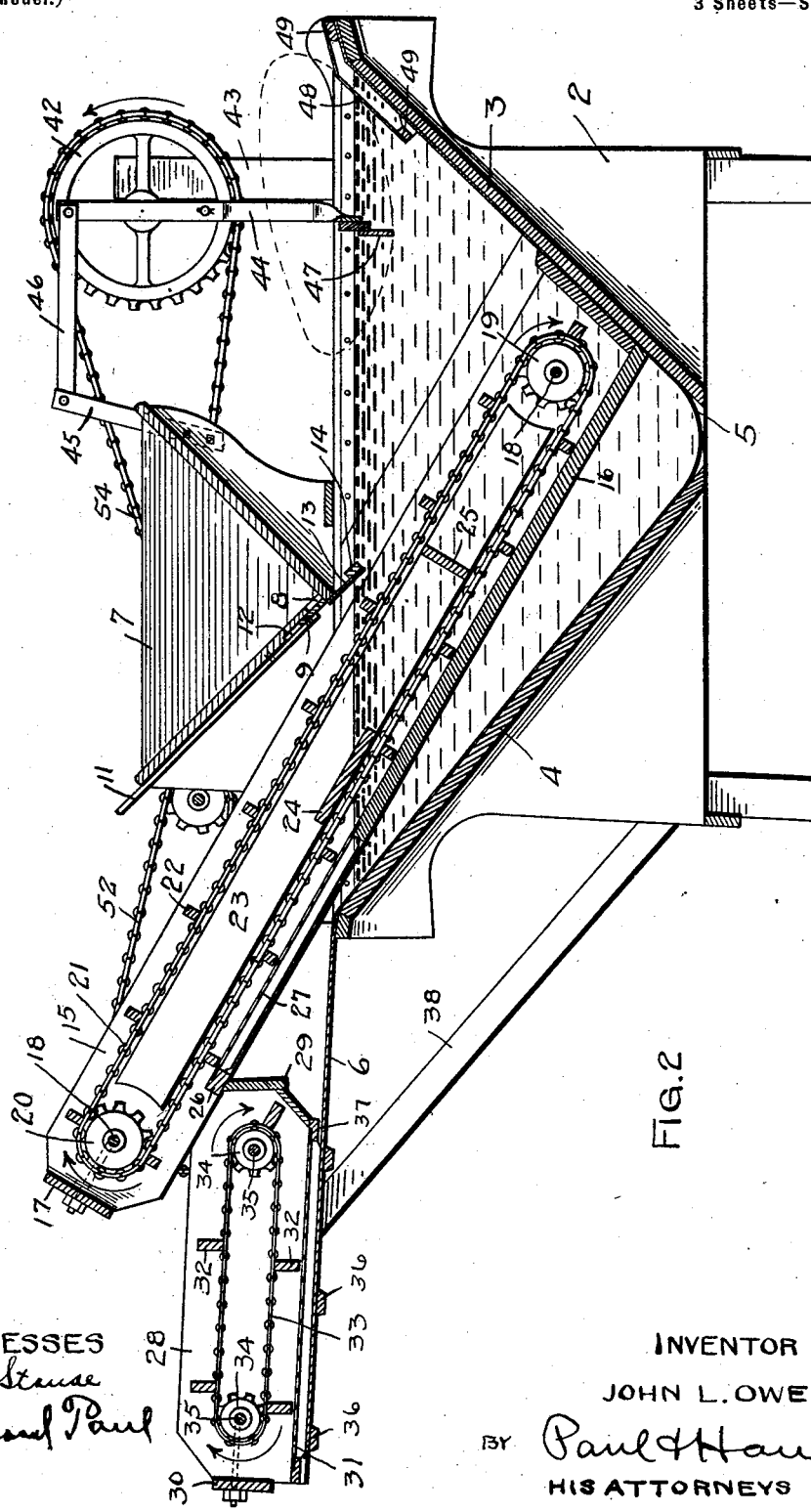

In the accompanying drawings, forming part of this specification, Figure 1 is a side elevation of a smut-machine embodying my invention. Fig. 2 is a vertical section of the same. Fig. 3 is a plan view. Fig. 4 is a detail of a skimming device. Fig. 5 is a detail of the hopper feed-board. Fig. 6 is a detail of the mechanism for adjusting the shafts of the carrier.

In the drawings, 2 represents a suitable frame wherein a tank is arranged containing a supply of water. This tank is provided with flaring or inclined walls 3 and 4 and has a suitable lining 5, preferably of metal, whereby the tank is rendered water-tight. The lining at one end of the machine has an extension 6, extending beyond the wall 4 of the tank, and is inclined slightly toward the tank for the purpose hereinafter described.

Above the tank is a hopper 7, of the usual form, having a discharge-opening 8 at the bottom, through which the grain flows down into the tank. For closing this opening to prevent the discharge of grain from the hopper I provide a plate 9, pivotally connected at one end with the wall of the hopper by a link 10 and at its other end connected to an operating-lever 11, that is also pivoted on the hopper. This lever is adapted to oscillate on its pivot and move the plate 9 laterally to uncover the discharge-opening, and I prefer to provide a recess 12 in the hopper-wall, wherein the plate oscillates. As clearly indicated in Fig. 5, when the plate is in the position indicated by dotted lines the discharge-opening will be uncovered and grain permitted to flow from the hopper. Upon moving the lever to the position indicated by full lines in said figure the hopper-opening will be closed. At the bottom of the hopper, near the discharge-opening, I provide a guiding strip or plate 13, preferably flexible, extending down into the water in the tank and held in its proper position by a float 14. Within the water-tank and extending above the top of the same at one end of the machine is an elevator trunk or flight comprising side boards 15, one of which is secured to the wall of the tank and the other preferably occupying a position near the opposite wall and connected on the under side by a close floor or bottom plate 16, that extends preferably up to the level of the water in the tank. The upper ends of the side boards are preferably connected by a cross-bar 17. Mounted in bearings on the side boards, near the ends of the elevator-trunk, are shafts 18, provided with sprockets 19 and 20, over which the chains 21 pass, that are connected at intervals by slats 22. I prefer to provide guiding strips or boards 23 for said chains on the side boards 15, and these guiding-boards are preferably connected by a board 24, which prevents the slats in their upward movement over the floor 16 from rising up and sliding over the grain, and side boards 23 also act as guides for the chains during their downward movement into the tank. As the grain is discharged from the hopper it will fall into the water directly in the path of the moving slats 22, and these slats will agitate the water sufficiently to separate the smut and light foreign material from the grain and drive it forward under the flexible plate 13, while the grain will settle down into the elevator-trunk and lodge upon the floor 16. The cross-board 25 will act as a guide or guard to prevent the grain from dropping down into the lower end of the elevator-trunk or from escaping therefrom and becoming mixed with the refuse material.

One of the primary objects of my invention is to discharge the grain into the water as rapidly as possible and remove it from the water with as little delay as will be consistent with a thorough separation of the smut and other foreign material. The elevator chain or carrier is therefore adapted to pass the hopper close to its discharge-opening, so that the water will be agitated and the wheat subjected to the washing process as soon as it drops into the tank, and after settling to the bottom of the trunk will be gathered up without delay by the returning slats and lifted out of the tank. The wheat is therefore removed from the water immediately after the separation of the smut therefrom.

Near the upper end of the elevator-trunk is a cross-bar 26, between which and the floor 16 I provide a perforated plate 27, over which the slats 22 sweep after leaving said floor. The grain that is gathered up by these slats will be drained of water while passing over the perforated floor, and I prefer to provide a trough or box 28 beneath the upper end of the elevator-trunk and into which the grain is discharged by the conveyer-slats over the cross-bar 26. The box 28 has suitable end boards 29 and a cross-bar 30 and is provided with a perforated floor 31, over which the grain is swept by slats 32, connecting chains 33, that pass over sprockets 34 on shafts 35, mounted on the ends of said box.

The grain as it is discharged into the box is swept over the perforated floor and the water allowed to drain out of the same, while the grain is pushed forward and out of the open discharge end of the box. The extension 6 of the lining of the tank extends under the perforated floor 35 and receives the water therefrom and conducts the same to the tank. I prefer to secure the extension 6 to the bottom of the trough or box 28 and provide a series of cross-bars 36, supporting the same, and between said extension and the inner end of the trough I provide an opening 37, through which the water flows on its way back to the tank. With this construction the wheat on leaving the water is drained in passing over the plate 27, then shaken up or agitated in its discharge from the elevator-trunk into the box or trough 28, then subjected to a second draining operation before its discharge out of the machine. Braces 38 may be provided for supporting the trough on the frame of the machine. I prefer to provide means for adjusting the tension of the conveyer-chain, the shafts of which are adjustable in slots 39, as shown in the side walls of the box 28 in Fig. 1. Each end of the shaft 35 is provided with an eye 40, to which is connected a hook 41, that extends through the cross-bar 30 and is rendered adjustable by means of a nut on its threaded end. Cross-bar 17 on the elevator-trunk is connected in a similar manner with the adjacent shaft 18.

The smut and other light deleterious substances that are separated from the grain rise to the top of the tank on the right-hand side of the hopper and collect there on the surface of the water, and at this point I prefer to provide means for skimming the surface of the water and gathering up the refuse material thereon. To this end I mount a gear-wheel 42 on a standard 43, and on said wheel near its circumference I pivot a lever 44, that is pivotally connected with an arm 45, secured on the side of the hopper by a link 46. The lever 44 extends down near the surface of the water and is provided with a scoop device or skimmer 47, that is preferably of rubber and sweeps over and through the water with a gyrating movement when the wheel 42 is revolved. On the wall 3 at the top of the tank is a perforated plate 48, supported on slats 49 and raised above said wall. The skimmer-blade in its movement sweeps up over said plate and carries the smut and other refuse material up onto the plate and leaves it there to drain. In the next stroke of the blade it sweeps a further quantity of smut up onto the plate and pushes the first deposit still farther up, until it finally is discharged over the edge of the tank, each skimmerful or load being left on the perforated plate for an interval to drain before being discharged out of the machine.

Any suitable means may be provided for driving the carriers and other mechanism; but I have shown a driving-shaft 50, provided with a crank 51 for operating the machine by hand. A chain 52 connects a sprocket on the shaft 50 with a similar sprocket on the shaft 18 at the top of the elevator-trunk, and a chain 53 connects a sprocket on said shaft 18 with a sprocket on the shaft 35 beneath. A large gear 42 is driven by a chain 54 from a sprocket on the shaft 50.

The operation of the machine is as follows: The lever 11 having been operated to uncover the hopper-opening, the grain will flow down into the tank and upon striking the water will be stirred up and agitated by the slats of the conveyer, and the kernels of grain will settle between said slats down upon the floor of the elevator-trunk, from whence they will be gathered up on the upward movement of the slats, carried over the perforated grain-floor 27, discharged into the trough 28, and there subjected to a second draining process before passing out of the machine. The plate 13 will prevent the grain from being swept along under the hopper and mixed with the refuse material, and the smut and other light particles remaining on the surface of the water will be carried forward by the agitating movement of the conveyer-slats until they come into the path of the skimmer, when they will be swept up on the draining-plate and from thence out of the machine. I am thus able to effect a very rapid and thorough separation of smut and other light refuse material from wheat or other grain without the necessity of keeping the wheat for any length of time in the water or passing it through any drying process after it leaves the machine.

In various ways the details of construction may be modified by any one skilled in the art without departing from my invention.

I claim as my invention—

1. The combination, with a tank adapted to contain a supply of water and provided with a suitable hopper, of an inclined elevator-trunk within said tank beneath said hopper, a floor 16 in the bottom of said trunk whereon the grain falls from said hopper, a slatted elevator-belt adapted to sweep over said floor and carry the grain to the upper end thereof out of the water in the tank, a perforated plate or section provided near the upper end of said floor whereon the grain is partially drained before its discharge by said conveyer, a trough beneath the discharge end of said floor to receive the grain therefrom, a perforated floor therein whereon the grain falls and is drained a second time, and a slatted belt operating over said perforated floor to sweep the grain to the discharge end of said trough, substantially as described and for the purpose specified.

2. The combination, with a tank adapted to contain a supply of water and provided with a suitable hopper, of an inclined elevator-trunk within said tank beneath said hopper, a floor 16 in the bottom of said trunk whereon the grain falls from said hopper, a slatted elevator-belt adapted to sweep over said floor and carry the grain to the upper end thereof out of the water in the tank, a trough 28 beneath the discharge end of said floor to receive the grain therefrom, a perforated plate 31 in the bottom of said trough whereon the grain falls and is drained of the water, a slatted belt operating over said plate to sweep the grain to the discharge end of said trough, and an imperforate plate 6 provided beneath said trough and plate and whereon the water drained from the wheat is conducted back to said tank, substantially as described and for the purpose specified.

3. The combination, with a tank adapted to contain a supply of water and provided with a suitable hopper, of an inclined elevator-trunk within said tank beneath said hopper, a floor 16 in the bottom of said trunk and whereon the grain falls from said hopper, a slatted elevator-belt adapted to sweep over said floor and carry the grain to the upper end thereof out of the water in the tank, a perforated plate or section provided in the upper end of said floor whereon the grain is partially drained of water before its discharge by said conveyer, a substantially horizontal trough 28 beneath the discharge end of said floor, a perforate plate 31 provided in the bottom of said trough and whereon the grain falls from said floor and is subjected to a second draining operation, a slatted belt operating over said plate to sweep the grain to the discharge end of said trough, and an imperforate plate 6 provided beneath said trough and perforate plate and inclined slightly toward said tank, whereby the drippings from said trough will be conducted back to said tank, substantially as described and for the purpose specified.

4. The combination, with a tank adapted to contain a supply of water and provided with a suitable hopper and a grain-elevating mechanism, of a sprocket-wheel supported on the wall of said tank, means for driving said wheel, a lever 44 pivoted eccentrically on said wheel and depending to a point near the water in said tank, a skimmer device 47 provided on the lower end of said lever and adapted to sweep over the surface of the water when said lever is actuated, a fixed arm 45 and a link 46 pivotally connecting said arm 45 and the upper end of said lever, whereby when said wheel is revolved a gyrating motion will be imparted to said lever and skimmer, for the purpose specified.

5. The combination, with a tank adapted to contain a supply of water and provided with a suitable hopper and grain-elevating devices, of a gear-wheel supported on the wall of said tank, means for driving said wheel, a lever 44 eccentrically pivoted on said wheel and depending to a point near the surface of the water in the tank, a skimming device provided on the lower end of said lever and adapted to sweep over the surface of the water and gather up the smut thereon, a perforated plate provided on the wall of said tank whereon the smut is deposited by the action of said skimmer, and means connected with the upper end of said lever, whereby when said wheel is revolved said lever will be gyrated, substantially as described.

In witness whereof I have hereunto set my hand this 29th day of January, 1901.

JOHN L. OWENS.

In presence of—
A. C. PAUL,
M. C. NOONAN.